United States Patent [19]

Battistoni et al.

[11] 3,740,726

[45] June 19, 1973

[54] LEFT ZERO CIRCUIT FOR KEY ENTRY DEVICE

[75] Inventors: Richard B. Battistoni, Pleasant Valley; Vincent Ferreri, Poughkeepsie; George A. Gates, Hyde Park; John Lettieri, Woodstock, all of N.Y.

[73] Assignee: International Business Machines Corporation, Armonk, N.Y.

[22] Filed: Oct. 7, 1971

[21] Appl. No.: 187,479

[52] U.S. Cl. .............................................. 340/172.5

[51] Int. Cl. .............................................. G06f 3/00

[58] Field of Search .................................. 340/172.5

[56] References Cited

UNITED STATES PATENTS 3,360,781 12/1967 Boehnke .......................... 340/172.5

3,665,403 5/1972 Igel ................................. 340/172.5

*Primary Examiner*—Raulfe B. Zache

*Attorney*—William S. Robertson

[57] ABSTRACT

An improved left zero circuit is provided for a buffered key entry device such as a card punch. Keyed characters are entered into the first and second buffers of the key entry device through a third buffer that stores fields of the record being keyed. Logic and timing circuits are provided for transferring characters from the first buffer to the first buffer in a succession of shifts that move an entry to the right most position of a data field.

12 Claims, 6 Drawing Figures

INVENTORS
RICHARD B. BATTISTONI
VINCENT FERRERI
GEORGE A. GATES
JOHN LETTIERI

BY W. S. Robertson
ATTORNEY

LEFT ZERO CIRCUIT FOR KEY ENTRY DEVICE

RELATED APPLICATIONS

Related Applications Ser. No. 158,343, filed June 30, 1971, and Ser. No. 155,449, filed June 22, 1971, show other features of the preferred key entry device. Some of the components referred to in this specification are shown in further detail in these related applications. In addition, the preferred key entry device is described in the publication, "129 Card Data Recorder Theory/-Maintenance", No. SY22-6882-0, published by the assignee.

INTRODUCTION

The specific key entry device that will be described later is a card punch for an 80 column card. Characters from a keyboard are stored in a first 80 character buffer memory until an entire record has been keyed. The record is then transferred to a second 80 column buffer that controls the operation of punching a card. The first and second buffers operate in an overlapping fashion with the second buffer controlling the punchng for a previously keyed record while the first buffer stores the entries for the next record to be punched.

Both the first and the second buffers store three programs and a program may be selected to control certain operations. For example, suppose that each card in a punching operation is to store an employee's name in column 1 through 20, that columns 21 through 70 are to be skipped, and that columns 71 through 80 are to store the amount of the employee's pay. Such a group of contiguous columns for a particular function is called a "field", and for each card column the program has a control bit called "Field Definition" that defines the limits of each field. Many entries begin at the left most column of the associated field. In the example already introduced, each employee's name would begin in column 1. By contrast, the employee's pay entry illustrates the usefulness of a left zero circuit. These entries are easier to read when they are aligned to the right most part of the field because then for every card for this format each column of this field corresponds to a particular numerical position in the pay amount. Since the keying begins with the left most column of the field and any blanks remain to the right, a left zero circuit shifts the keyed characters to the right by the number of blanks that remain after the field has been keyed. Thus, the blanks are shifted from the right most columns of the field to the left most columns and in the punched card these left most columns can be left blank or they can be punched to store zeros.

The preferred buffer uses field effect transistor circuits in which a data bit is represented by the charge storage state of a capacitor. The circuit is operated to shift the data from one bit position to the next to regenerate the state of the charge holding capacitors. Each column or character position in these buffers has 12 bits for storing a character in the conventional punched card code, 6 bit positions for storing temporary control signals that are called "flags", and 6 bit positions for each of the three programs stored in each buffer. Thus, each column position in these buffers is represented by 36 bit positions that appear serially at an input/output position of the buffer as the buffer is shifted. The 36 bit positions are organized as six groups, designated G0 through G5, each made up of 6 bit positions each designated B0 through B5. A circuit called a "column ring" operates with the buffer timing circuits to identify the column at the input/output position of the buffer. A circuit called a "column counter" identifies the column position in the first buffer where the next character is to be entered from the keyboard. Such an entry can be made only when the column number stored in the column conter equals the column indicated by the column ring circuit. A timing signal called "Compare" is produced during the interval of 36 bit times when these two circuits have coincident outputs. Read and write operations on the first buffer take place at the compare time.

A description of a known circuit for a key entry device of this general type will be a helpful introduction to to the objects and features of this invention. The buffer is formed in part by a sonic wire delay line and in part by a transistor shift register that is a few bit positions in length. Data can be selectively routed through the transistor shift register stages or can be routed to bypass the transistor stages. Data that is transmitted through the transistor stages is shifted to the left with respect to data that bypasses the stages. Suitable control signals are developed for producing a sequence of these shifts to product a left zero or left blank operation.

THE INVENTION

One of the objects of this invention is to avoid the use of transistor shifting stages or other specialized circuits. Advantageously, the circuit of this invention uses a buffer memory of the same technology as the first and second buffers, preferably a field effect transistor shift register. This buffer does not hold program or flag bits and thus has 12 bit positions for each of its 80 character positions. In the cited publication, this buffer is called the "C" buffer and the first and second buffers introduced earlier are called respectively the "A" and the "B" buffer.

When a key on the keyboard is closed, the corresponding 12 bit code is entered into appropriate positions in the C buffer. At a predetermined time in the mechanical cycle of closing the key (referred to later as "Enter Gate"), the 12 bit code is read at the output of the C buffer and is written in the A buffer.

The operation just described proceeds character by character without regard to whether a left zero operation is intended. To put an entry in the left zero format, the operator closes a key called "Left Zero". Closing the key produces a shift to the left of one character position in the C buffer. A blank or a zero is selectively inserted in the left most position in the field in both the C and A buffers and the field in the C buffer is written into the A buffer. This operation produces a shift of one character position to the right in the A buffer. The column counter is then advanced to the next position to the right. If this position is still within the field, a second shift to the right is made in an operation that is somewhat similar but not identical to the operation just described. The shifts are continued until the column counter leaves the field.

Further features of the invention will be found in the specific description of the logic and timing circuits of the preferred embodiment of the invention.

The Drawings

THE CIRCUIT OF THE DRAWING

Figure 1:
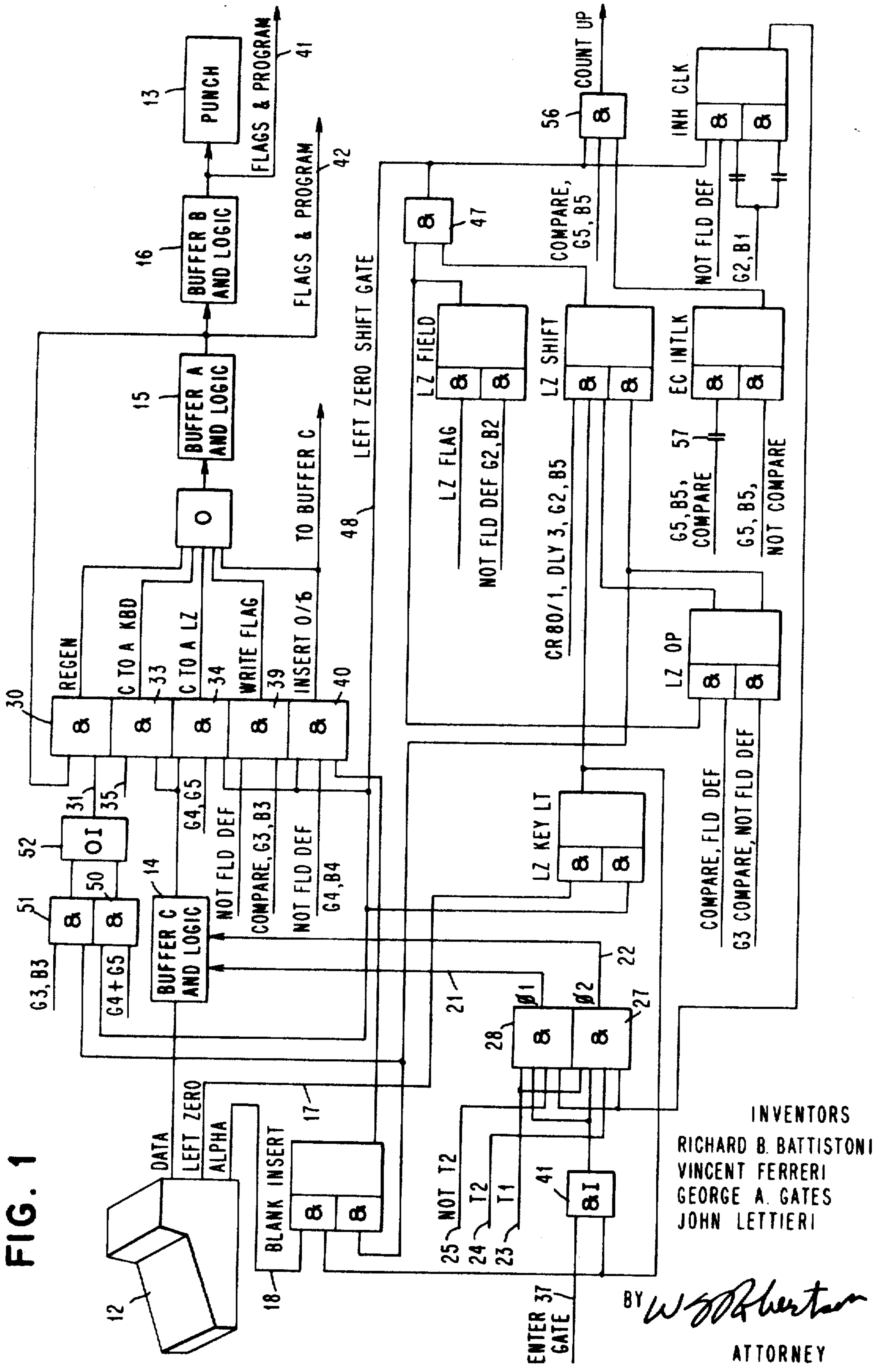
FIG. 1 is a schematic of the preferred embodiment of the left zero circuit of this invention and associated components of a key entry device.

Introduction FIG. 1 shows a keyboard 12 and a punch mechanism for other data recording device 13. The C buffer 14, the A buffer 15, and the B buffer 16 have been introduced eariler and lines in the drawing show the general flow of information from the keyboard 12 through the buffers to the punch 13. In addition, the keyboard 12 produces an output 17 from a Left Zero Key and an output 18 from a key called "Alpha" that among other functions signifies that any remaining columns in a left zero operation are to be filled with blanks instead of zeros.

Data in each of the three buffers is recirculated at a rate that is much higher than the rates of keying or punching and as already explained, this high speed shifting operation is primarily for the purpose of maintaining a data signifying pattern of charges on capacitors in a field effect transistor array. The inputs 21, 22 called phase 1 and phase 2 ( $\phi1$ and $\phi2$ ) provide timing for shifting the C buffer. The drawing also shows primative timing signals T1, T2 and NOT T2 on lines 23, 24, 25 to illustrate timing gating circuits 27, 28 that will be described later. Buffers A and B also receive phase 1 and phase 2 timing signals but they are independent of gates 27, 28 and buffers A and B are shifted continuously in the operations that will be described.

The drawing shows circuits for selectively recirculating data in buffer A, inhibiting the recirculation so as to erase portions of the buffer, and for entering data from the output of buffer C and from the left zero circuit. A gate 30 is controlled according to an input 31 to transmit data from the output of the buffer to its input. When line 31 is at a zero logic level, the recirculation is inhibited and the corresponding bits are erased. Gates 33 and 34 transmit the output of buffer C to the input of buffer A. Gate 33 is conditioned by an input 35 which is a logic function of a signal "Enter Gate" (also shown in line 37 as part of the left zero shift circuit) which is developed during the timing sequence associated with closing a keyboard key. Gate 34 is energized as will be explained later for a transfer from C to A that produces a shift of one column to the right during a left zero shift operation. Gates 39 and 40 each respond to inputs that will be described later for writing in buffer A for a left zero operation. Both buffers B and C have gating circuits that are analogous to the circuits described for buffer A. Buffer B does not take part in the left zero operation except that it supplies programs, indicated by an output line 41, with which the left zero operation can be used. Buffer A similarly supplies program and flag bits as indicated by a line 42.

The remaining circuit components in FIG. 1 will be introduced as they appear in the operations illustrated by the timing charts of FIGS. 2A, 2B, 3A, 3B and 4. In the timing and logic inputs of the drawing a comma signifies an AND function and a plus sign indicates an OR function. Thus, the term "G3,B3" signifies a bit time that occurs at the coincidence of timing signals G3 and B3. Similarly, the term "G4+G5" signifies a timing sequence that extends through the two consecutive group times G4 and G5.

OPERATION — FIG. 2

Figure 2A:
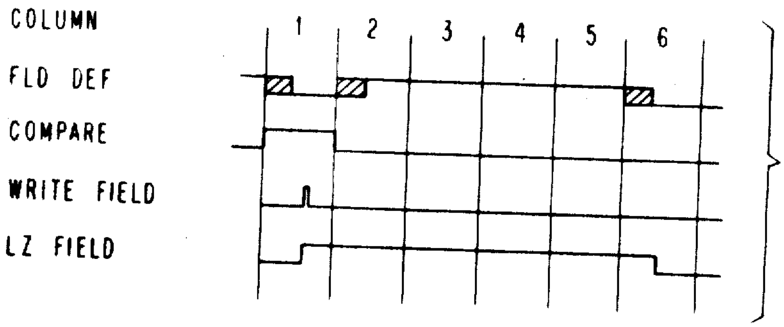
FIGS. 2A and 2B show the timing of circuits that operate during normal keying to prepare for a left zero opertion.
Figure 2B:
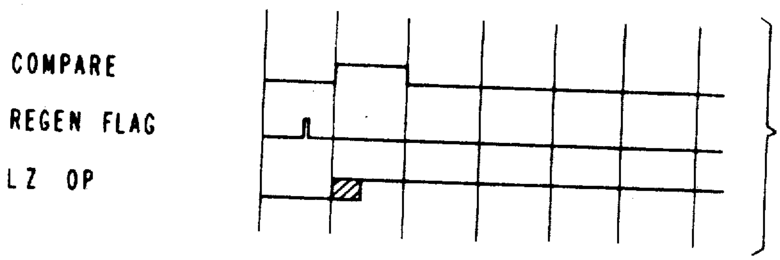

FIGS. 2A and 2B show the buffer timing for a five column field and the first column of the next field. The field is defined by a signal "Field Definition" (FLD DEF) which is developed by reading the B1 program bits on the selected line 41 or 42 for each of the columns of the selected program time G0, G1, or G2. This signal has a zero logic level for the first column of each field and a one logic level for each subsequent column. The exact rise and fall times of this signal depend on which program is selected and this range of times is shown in the drawing by cross hatching. FIG. 2A shows the operation in the first column of the field and the compare signal has a one logic level in the first column and a zero logic level for all other columns of the buffer. In response to the coincidence of compare and NOT field definition, circuit 39 writes a flag in buffer A at time G3,B3. Circuit 30 inhibits regenerating the G3,B3 or left zero flag and the flag uniquely identifies the first column of the field in which keying is taking place. In response to the left zero flag, a latch called left zero field ( LZ FIELD ) is set. This latch is reset at bit time G2,B2 when the timing signal field definition equals 0 as occurs in the first column of the next field. Thus, the latch left zero field is set near the beginning of the field and is reset near the end of the field of each buffer cycle to distinguish the field in which keying is occurring from all other storage locations in the buffer.

FIG. 2B shows additional logic operations that take place as the keying operation enters the second column of the field but before the left zero key is closed. Thus, the operation of FIG. 2B does not take place either in a single column field or in an unformatted operation in which the field definition signal remains at a zero logic level. In response to the coincidence of field definition and compare, a latch left zero operation ( LZ OP ) is set. This latch remains set through out the keying operation within the field. In response to the setting of the left zero operation latch, gate 30 is conditioned to regenerate the left zero flags in buffer A. (The flag is written only while the keying operation is in the first column of a field). Thus, at the end of keying the second column of the field, the left zero operation latch has been set and the left zero field latch continues to be set and reset in the way described for FIG. 2A. The circuit is now ready to respond to the left zero key and normal keying continues without change in the left zero circuit until the left zero key is closed. If the operator enters the next field without closing the left zero key, the left zero operation latch is reset in respone to the coincidence of compare and NOT field definition, and the left zero flag is erased in the position shown in FIG. 2 and is rewritten in the first column of the next field.

Figure 3A:
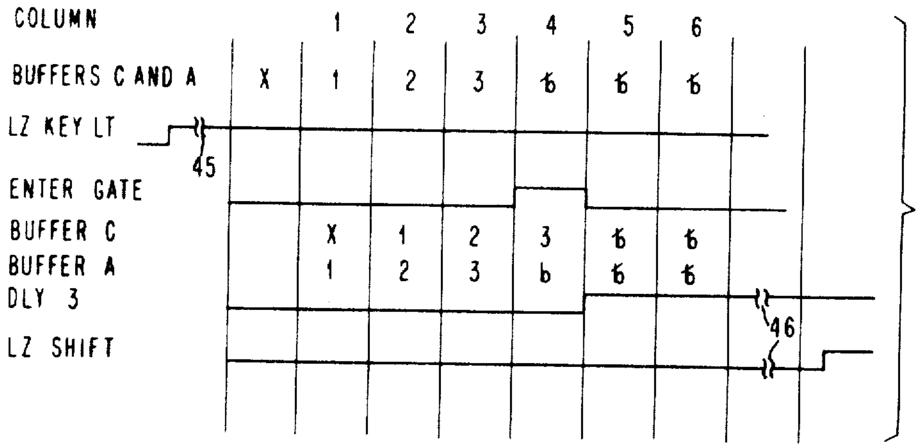
FIGS. 3A and 3B show the timing of circuits that operate when a left zero key is closed to produce a first shift or one column to the right.
Figure 3B:
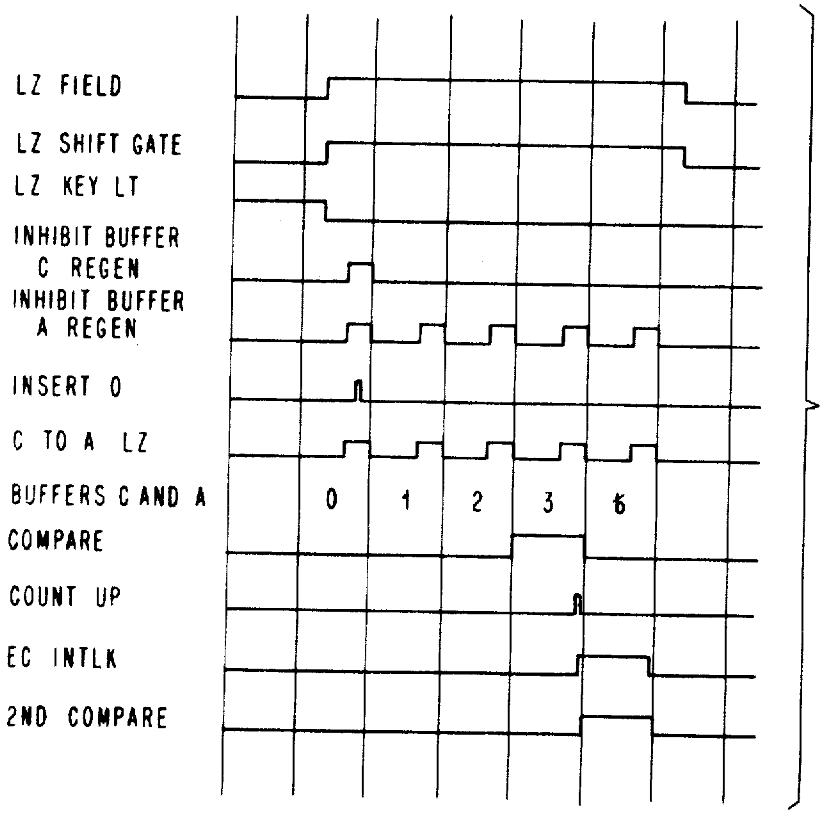

OPERATION — FIGS. 3A and 3B

FIGS. 3A and 3B show the operation when the operator has keyed the sequence 1, 2, 3 into columns 1, 2 and 3 of the field in buffers C and A and columns 4 and 5 remain blank ( 1$\phi$ ). The X entries signify extraneous data from a previous field. The operator then closes the Left Zero Key and sets a latch, Left Zero Key Latch ( LZ KEY LT ). The Left Zero Key Latch can be set at any point in the buffer cycle and the break 45 in the timing line signifies a timing interval that is independent of the buffer timing. The signal "Enter Gate" produced on line 37 occurs at a predetermined time in the keyboard timing sequence in coincidence with a Compare signal which in the operation of FIG. 3A occurs in field column 4, the first blank column the left zero field of the drawing. In response to the Enter Gate signal on line 37 and the NOT Left Zero Key Latch signal, a gate 41 inhibits the two gates 27, 28 introduced earlier from transmitting timing signals to buffer C. Since the Enter Gate signal is at a one logic level for a full column time of 36 bit times, the C buffer is shifted one column position to the right with respect to the A buffer which continues to be advanced in response to phase 1 and phase 2 timing pulses. FIG. 3A also shows the data in both buffers A and C after this operation. Notice that the C buffer now holds an extraneous character in the first column of the field. FIG. 3A also shows a keyboard timing signal DLY3 that rises on the fall of the Enter Gate signal. After a delay indicated by a break 46 in the DLY3 timing line, a latch, Left Zero Shift (LZ SHIFT ) is set at bit time G2,B5 in the first column of the buffer. The input CR 80/1 shown in FIG. 1 is developed from the Column Ring timing to identify the last portion of column 80 ring time and the first portion of column 1 ring time to signal the end of one buffer cycle and the beginning of the next. Thus, the Left Zero Shift latch is set at the beginning of the buffer cycle following the shift in the C buffer that has just been described.

FIG. 3B shows the Left Zero field portion of the buffer cycle that follows the cycle shown in FIG. 3A. The Left Zero Shift Latch conditions an AND circuit 47 to transmit the output of the Left Zero Field latch to a line 48 which produces a signal called "Left Zero Shift Gate" which is identical to the Left Zero Field latch output and thus defines the columns that make up the Left Zero field. In the buffer cycle shown in FIG. 3B, the signal Left Zero Shift Gate resets Left Zero Key Latch and conditions a system of gates 50, 51, 52 to inhibit regenerating data in buffer C at times G4 and G5 of the Left Zero field. The Left Zero Shift Gate signal also conditions gate 34 to transmit data from buffer C to buffer A during the Left Zero field.

When closing the Left Zero Key, the keyboard operator may select a blank to fill the left most position of the field by closing the Alpha Key which energizes the line 18 in coincidence with the set output of the Left Zero Key Latch to set a latch, "Blank Insert". If the Alpha Key is not closed, the Blank Insert latch remains reset and its reset output conditions an input of gate 40 to transmit a numeric zero signifying bit (G4,B4) to the first column ( defined by NOT field definition ) of the Left Zero field ( defined by Left Zero Shift Gate ).

By means of logic not explicitly shown in FIG. 1 but illustrated by the logic for buffer A, buffer C regeneration is also inhibited at time NOT Field Definition, G4+G5, Left Zero Shift Gate to erase the extraneous entry in the left most column of the field and this column is left blank or a zero is inserted according to the output of gate 40.

The second array of the contents of buffers C and A in FIG. 3B shows the results of these write operations.

The Left Zero Shift Gate signal also conditions a gate 56 to transmit a pulse G5,B5 to advance the column counter (not shown). When the column counter is advanced, the Compare signal is extended into the next column time. The two parts of the extended Compare pulse are shown separately in FIG. 3B to better distinguish the related operations but they occur at successive column times as the drawing shows and form a two column pulse. In response to the coincidence of the Compare signal and the fall of timing pulse G5,B5 (as provided by the capacitor 57) a latch "EC Interlock" (EC INTLK) is set and it remains set until after the fall of the extended Compare pulse to prevent gate 56 from producing a second count up signal.

Figure 4:
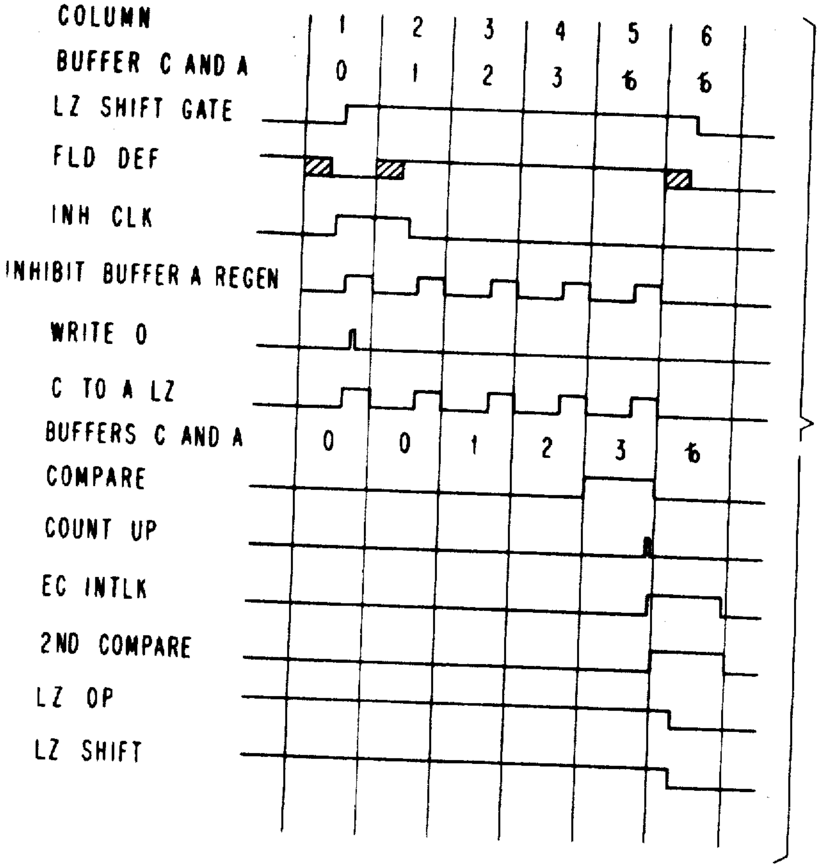
FIG. 4 shows the timing of circuits that operate for subsequent one column shifts.

FIG. 4 shows the shifting operation for the next buffer cycle. On the coincidence of NOT Field Definition, at the beginning of the field, a timing pulse G2,B1, and the Left Zero Shift Gate, a latch "Inhibit Clock" ( INH CLK ) is set. The latch is reset at the next G2,B1 time and thus defines an interval of 36 bit times. When latch Inhibit Clock is set, it inhibits gates 28, 29 introduced earlier, and delays buffer C for one column time in the way already described. The cycle then continues with the write operation and the count up operation shown in FIG. 3B and already described.

The operation of FIG. 4 continues until the column counter is advanced into the first column of the next field. FIG. 4 also illustrates this operation. In response to the coincidence of NOT Field Definition, the extended Compare and time G3, the latch Left Zero Operation is reset. The latch Left Zero Operation resets latches Left Zero Shift and Blank Insert. At time G3,B3 the left zero flag is written to begin the next left zero field operation as shown in FIG. 2A.

The dash key (not shown) is used at the end of a numeric field to signify that the field is negative. Thus, this key signifies the end of a field in which a left zero operation is ordinarily required and the dash key signal is advantageously combined in a logical OR functon with the left zero key at the set input of the Left Zero Key Latch. The term "Left Zero Operation Key" will be used to identify any keys that start the shift operation.

Thus, a right adjust or left zero/blank circuit has been provided that advantageously uses shift register buffer memories of the type that commonly use field effect transistors. From the description of one embodiment of the invention, those skilled in the art will recognize that the invention can be adapted to various key entry devices and logic technologies within the spirit of the invention and the scope of the claims.

What is claimed is:

1. A left zero circuit for a key entry device having a first buffer for holding a record entered from a keyboard, a second buffer for receiving from said first buffer a completed record to be applied to a data recording medium such as a card to be punched, means in one of said first and said second buffers for storing a program defining a first column in each field of a record to be keyed, each of said buffers having a plurality of shift register stages, one for each bit position, means for shifting said stages serially at a rate that is higher than the keying rate and is independent of keying operations for regenerating data in the buffers and for scanning the data at an input/output position, said left zero circuit comprising, a third buffer for holding each character of a record keyed from said keyboard, means shifting said third buffer in synchronism with said first buffer, whereby bit positions and column positions at an input/output position of said third buffer correspond to positions at said input/output position of said first buffer, means operable during the keying of a character from said keyboard to said third buffer to enter said character into a corresponding position of said first buffer, whereby said first and third buffers have duplicate entries, a key on said keyboard for selecting a left zero operation, means for inhibiting the shifting of said third buffer with respect to said first buffer to produce a shift to the right in said third buffer, means responsive to closing said key to inhibit shifting said third buffer for a time to produce a first one column shift, means operable after said shift to insert a selected character or blank in the first column of said field of said first and third buffers, means to produce a first write operation of said field of said third buffer to corresponding positions in said first buffer to produce a one column shift to the right in said first buffer, and means responsive to the presence of an additional unkeyed column in said field in said first buffer for producing further shifts of a single column and further write operations until said operation enters the first column of the next field.

2. The circuit of claim 1 including means defining said field in said first buffer, comprising, means responsive to the entry of a keying operation into the first column of a field in said first buffer to store a unique flag in said column of one of said first and second buffers, a latch, means responsive to each occurrence of said flag to set said latch, and means responsive to the occurrence of the first column of the next field in said buffer to reset said latch.

3. The circuit of claim 2 including a second latch, means responsive to the entry of the keying operation into the second column of a field to set said second latch, and means responsive to the state of said second latch to control said flag storing buffer to regenerate said flag, whereby single column fields and programs not having defined fields are distinguished from multicolumn fields.

4. The circuit of claim 3 wherein said key entry device produces a unique signal of a time duration of scanning one column in said first buffer in response to closing a keyboard key, and said means responsive to closing said key comprises a third latch and means connecting said means for inhibiting to respond to the set condition of said third latch and to said unique signal for shifting said third buffer one column to the right with respect to said first buffer.

5. The circuit of claim 4 wherein said means to insert said character or blank after said first shift comprises timing means for producing the data pattern of said selected character, means responsive to the coincidence of said first column of said field and the previous completion of said first shift of said third buffer to inhibit regenerating the first column of said field of said first buffer and to write said selected character in said column, and means operated from said keyboard for inhibting said write operation to selectively produce a blank in said first column.

6. The circuit of claim 5 wherein said means for producing one of said further shifts comprises a fourth latch connected to be set after the fall of said unique signal producing said first shift and at the beginning of the first column of said first buffer.

7. The circuit of claim 6 wherein the means for producing said first write operation is connected to be responsive to the coincident set states of said first and fourth latches whereby said first write operation is prevented when said field is filled.

8. The circuit of claim 7 wherein said key entry device including means for producing a timing signal identifying in said first and third buffers the next column to be entered in a keying operation and said circuit includes means for advancing said column identifying timing signal one column in response to the coincidence of said column identifying timing signal and the set states of said first and fourth latches, whereby said next column to be entered is advanced after a write operation.

9. The circuit of claim 8 wherein said means for producing said further shifts in said third buffer comprises a fifth latch, means producing triggering signals at intervals of one column time, and means responsive to the set states of said first and fourth latches and the occurrence of said first column of said field in said buffer and to said triggering means to set said fifth latch, and means connecting said fifth latch to control said means for inhibiting shifting said third buffer to produce a one column shift to the right.

10. The circuit of claim 9 wherein said first buffer includes register stages for program and flag bits in the early scanned bit positions of a column position and register stages for data bits in later scanned bit positions and wherein said means for producing said triggering signals includes means to produce said triggering signals during said early scanned bit positions whereby said shift is completed before said scan of data in the second column of said field and after said selected character or blank has been stored in said first column position of said field in said first and second buffers whereby said shift in said third buffer, said character or blank store, and said shift in said first buffer occur during a single scan of said field in said first buffer.

11. The circuit of claim 10 wherein said circuit includes means for resetting said second latch when said next column identifying signal is advanced to the first column of a next field to thereby erase said flag and for resetting said fourth latch to stop the shift operation.

12. The circuit of claim 11 wherein said circuit includes means for resetting said third latch on the coincident set states of said first and fourth latches whereby the operation for said first one column shift in said third buffer is terminated and the operation for said first one column shift in said buffer and said second and subsequent one column shifts in said third and first buffers is begun.

* * * * *